United States Patent [19]
Lau et al.

[11] Patent Number: 6,156,812
[45] Date of Patent: Dec. 5, 2000

[54] NANOPOROUS MATERIAL FABRICATED USING POLYMERIC TEMPLATE STRANDS

[75] Inventors: Kreisler Lau, Sunnyvale, Calif.; Tian-An Chen, Duluth, Ga.; Boris Korolev, San Jose, Calif.

[73] Assignee: Honeywell International Inc., Morristown, N.J.

[21] Appl. No.: 09/544,723

[22] Filed: Apr. 6, 2000

Related U.S. Application Data

[60] Provisional application No. 60/128,534, Apr. 9, 1999.

[51] Int. Cl.⁷ ........................................................ C08J 9/02
[52] U.S. Cl. ............................ 521/77; 521/134; 521/138; 521/139; 521/181; 521/182; 521/184; 525/450; 525/534
[58] Field of Search .............................. 521/77, 134, 138, 521/139, 181, 182, 184; 525/450, 534

[56] References Cited

U.S. PATENT DOCUMENTS 4,661,558  4/1987  Bell et al. .................................. 525/36
5,965,679  10/1999  Godschaix et al. ...................... 526/281

*Primary Examiner*—Morton Foelak
*Attorney, Agent, or Firm*—Robert D. Fish; Fish & Associates, LLP

[57] ABSTRACT

Compositions and methods are provided in which nanoporous polymeric materials are produced via stable, polymeric template strands having reactive groups that can be used for forming crosslinking functionalities and/or adding thermolabile groups, wherein at least some of the thermolabile groups are thermolyzed to produce voids. The template strands preferably comprise aromatic systems and vicinal keto groups, such as a polybenzil formed from fluorene bisphenol or 3,3'-dihydroxytolane with 4,4'-difluorobenzil. At least some of the reactive groups preferably react using an addition-elimination reaction. Especially preferred thermolabile groups comprise poly(propylene oxide), and especially preferred crosslinkers comprise ethynyl-moiety and tetracyclone moieties.

25 Claims, 5 Drawing Sheets

5,156,812

NANOPOROUS MATERIAL FABRICATED USING POLYMERIC TEMPLATE STRANDS

This application claims the benefit of U.S. provisional application Ser. No. 60/128,534 filed Apr. 9, 1999, incorporated herein by reference in its entirety.

FIELD OF THE INVENTION

The field of the invention is nanoporous material.

BACKGROUND OF THE INVENTION

As the size of functional elements in integrated circuits decreases, complexity and inter-connectivity increases. To accommodate the growing demand of interconnections in modem integrated circuits, on-chip interconnections have been developed. Such interconnections generally consist of multiple layers of metallic conductor lines embedded in low dielectric constant material, and the dielectric constant in such materials has an important influence on the performance of an integrated circuit. Materials having low dielectric constants (i.e., below 2.2) are desirable because they typically allow faster signal velocity and shorter cycle times. Moreover, lowering of the dielectric constant reduces capacitive effects, leading often to less cross talk between conductor lines and lower voltages to drive integrated circuits.

One way of achieving low dielectric constants in insulator materials is to select materials with inherently low dielectric constants. Generally, two different classes of low dielectric constant materials have been employed in recent years—inorganic oxides and organic polymers. Inorganic oxides often have dielectric constants between 3 and 4, and have been widely used in interconnects with design rules larger than 0.25 $\mu$m. However, as the dimensions of interconnects shrink, materials with lower dielectric constants are generally required. Organic polymers have shown many advantageous properties including high thermal stability, ease of processing, low stress/TCE (thermal co-efficient of expansion), low dielectric constant and high resistance. Organic polymers are therefore frequently considered as alternative low dielectric constant polymers for the 0.18 $\mu$m and 0.13 $\mu$m generations.

Another way of achieving low dielectric constants is to introduce air into an appropriate material, since air has a dielectric constant of about 1.0. Air is usually introduced into a material by formation of minute voids (also referred to herein as pores), with a size in the sub-micrometer range. Such porous materials are then usually termed "nanoporous materials".

It is known to produce nanoporous polymers by providing a polymer with thermolabile groups, and then thermolyzing the thermolabile groups to produce voids. In prior art FIG. 1, for example, a monomer 1 is provided comprising a monomer backbone portion M having a thermo-labile group L. A polymer 2 is formed by polymerizing n repeating monomer 1, and the polymer 2 is subsequently crosslinked to form a crosslinked polymer 3. In a further step, the crosslinked polymer 3 is thermolyzed to remove at least some of the thermolabile groups L, thereby producing a nanoporous polymer 4 containing voids V. The method is conceptually simple, but typically allows only poor control over pore size and pore distribution.

In another approach, a thermostable polymer is blended with a thermolabile polymer. The blended mixture is then crosslinked and the thermolabile group thermolyzed. Examples are set forth in U.S. Pat. No. 5,776,990 to Hedrick et al. An advantage of this approach is that variations and modifications in the thermolabile polymer and the thermostable polymer are readily achieved. However, blending thermolabile and thermostable polymers once again typically allows only poor control over pore size and pore distribution.

In still another approach, thermolabile blocks and thermostable blocks alternate in a single copolymer, often termed a block copolymer. In prior art FIG. 2, for example, monomers A, B, C, and D, collectively identified with numeral 5, are provided in which at least one of the monomers carries a thermolabile group L, and at least one of the monomer carries a crosslinker. The monomers A, B, C, D are polymerized to form block oligomers 6, and n repeats of the block oligomers 6 are further polymerized to form a block copolymer 7. The block copolymer 7 is subsequently crosslinked to form a crosslinked block copolymer 8, and the thermolabile group is thermolyzed, resulting in a nanoporous polymer 9. This approach is advantageous in generally allowing good control over pore size and pore distribution, but may decrease the ultimate thermal and dimensional stability of the nanoporous material due to fragmentation of the polymer upon thermolysis of the thermolabile group. In addition, if the type or length of the thermolabile group need to be changed, new blocks and new copolymers must be synthesized.

Thus, in the known methods of introducing voids into nanoporous materials by thermolyzing thermolabile groups of polymers, there is an unfortunate tradeoff between control over pore size and pore distribution, and simplicity and flexibility of design and synthesis. By gaining control over the nature of the repeating units carrying the thermolabile group(s), one substantially dictates the qualities of the resulting nanoporous polymers. Modifications to the amount, chemical nature and positioning of the thermolabile group are not feasible once polymerization is finished.

Regardless of the approach used to introduce the voids, structural problems are frequently encountered in fabricating nanoporous materials. Among other things, increasing the porosity beyond a critical extent (generally about 30% in the known nanoporous materials) tends to cause the porous materials to collapse. Collapse can be prevented to some degree by adding crosslinking additives that couple thermostable portions with other thermostable portions, thereby producing a more rigid network. U.S. Pat. No. 5,710,187 to Streckle, Jr., describes crosslinking for this purpose, crosslinking aromatic monomers using multifunctional acyl- or benzylic halides.

Crosslinking of thermostable portions in nanoporous materials frequently has significant limitations. For example, the crosslinking agent needs to specifically react with the thermostable portion without interfering with the polymerization reaction. Moreover, the chemical structure of the thermostable portion and availability of reactive groups dictates the nature of the crosslinking agent. In addition, the crosslinking agent must be soluble in the same solvent system as the block copolymers or monomers. Still further, new and potentially useful additional moieties must be compatible not only with the chemical properties of the block copolymers, but also should not interfere with the polymerization reaction. In general, the introduction of functional elements into nanoporous materials by copolymerization is limited to the synthesis and availability of the block copolymers or monomers.

In summary, many methods are known to improve the physicochemical properties of nanoporous materials.

However, current methods tend to limit the ease with which differing functional elements can be incorporated. Surprisingly, despite great efforts to improve various properties in nanoporous materials, and many efforts to modify individual components of nanoporous materials, there is no system that permits relatively simple modifications of precursors to produce desired properties in the end products. Therefore, there is still a need for methods and compositions that permit relatively simple modifications of the precursors to produce desired properties in nanoporois materials.

SUMMARY OF THE INVENTION

In accordance with the present invention, compositions and methods are provided in which nanoporous polymeric materials are produced using stable, polymeric template strands having reactive groups that can be used for forming crosslinking functionalities and/or adding thermolabile groups. By using the polymeric template strands as modifiable templates, and manipulating the addition of thermolabile groups and the manner in which strands are crosslinked, many characteristics of the resulting nanoporous materials, including pore size, pore distribution, and overall strength, can be controlled.

In a preferred class of embodiments, the polymeric template strands comprise aromatic systems and vicinal keto groups. For example, a template strand may advantageously comprise a polybenzil formed from fluorene bisphenol and 4,4'-difluorobenzil. In another example a template strand may comprise a polybenzil formed from 3,3'-dihydroxytolane and 4,4'-difluorobenzil.

In another preferred class of embodiments, at least some of the reactive groups in a template strand are reacted with a modifying molecule, thereby forming crosslinking functionalities. In a further reaction, the crosslinking functionalities react with other crosslinking functionalities of a polymeric strand having thermolabile groups to form a crosslinked polymer. In a more preferred embodiment, the thermolabile groups comprise poly(propylene oxide), and the crosslinking functionalities comprise an ethynyl-moiety or a tetracyclone moiety.

In further preferred class of embodiments, at least some of the reactive groups in a template strand having crosslinking functionalities are reacted with a thermolabile group, and in a further reaction, the crosslinking functionalities of the template strand react with other crosslinking functionalities of a polymeric strand to form a crosslinked polymer. In a more preferred embodiment, the thermolabile groups comprise an aromatic portion as a connector, and in an even more preferred embodiment the thermolabile groups comprise a 1,2-diaminoaryl.

Various objects, features, aspects and advantages of the present invention will become more apparent from the following detailed description of preferred embodiments of the invention, along with the accompanying drawing.

DETAILED DESCRIPTION

Figure 1:
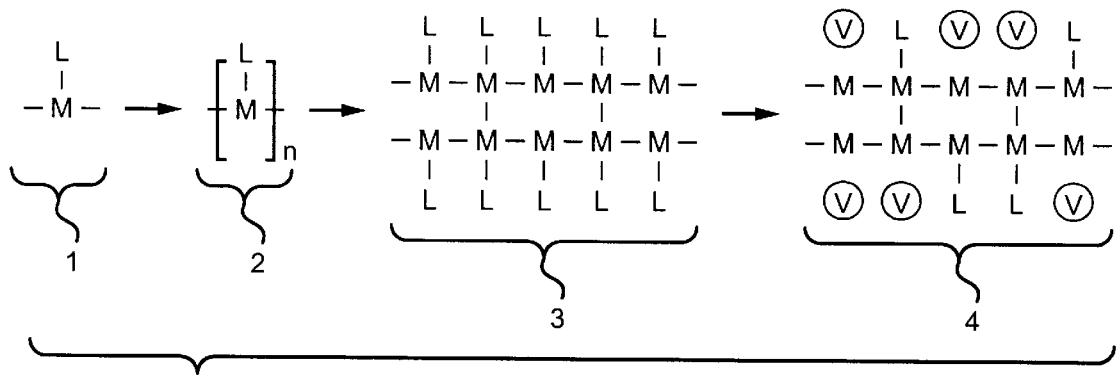
FIG. 1 is a prior art schematic showing fabrication of a nanoporous material from monomers containing a thermolabile group.
Figure 2:
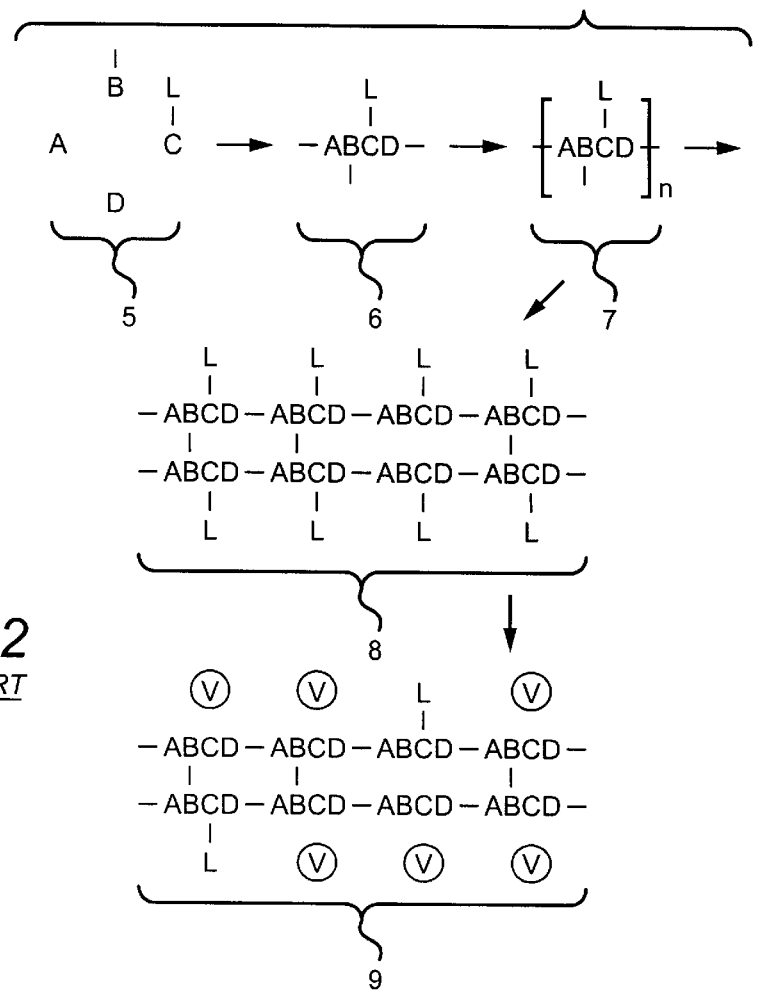
FIG. 2 is a prior art schematic showing the fabrication of a nanoporous material from block oligomers, wherein one of the blocks contains a thermolabile group.
Figure 3:
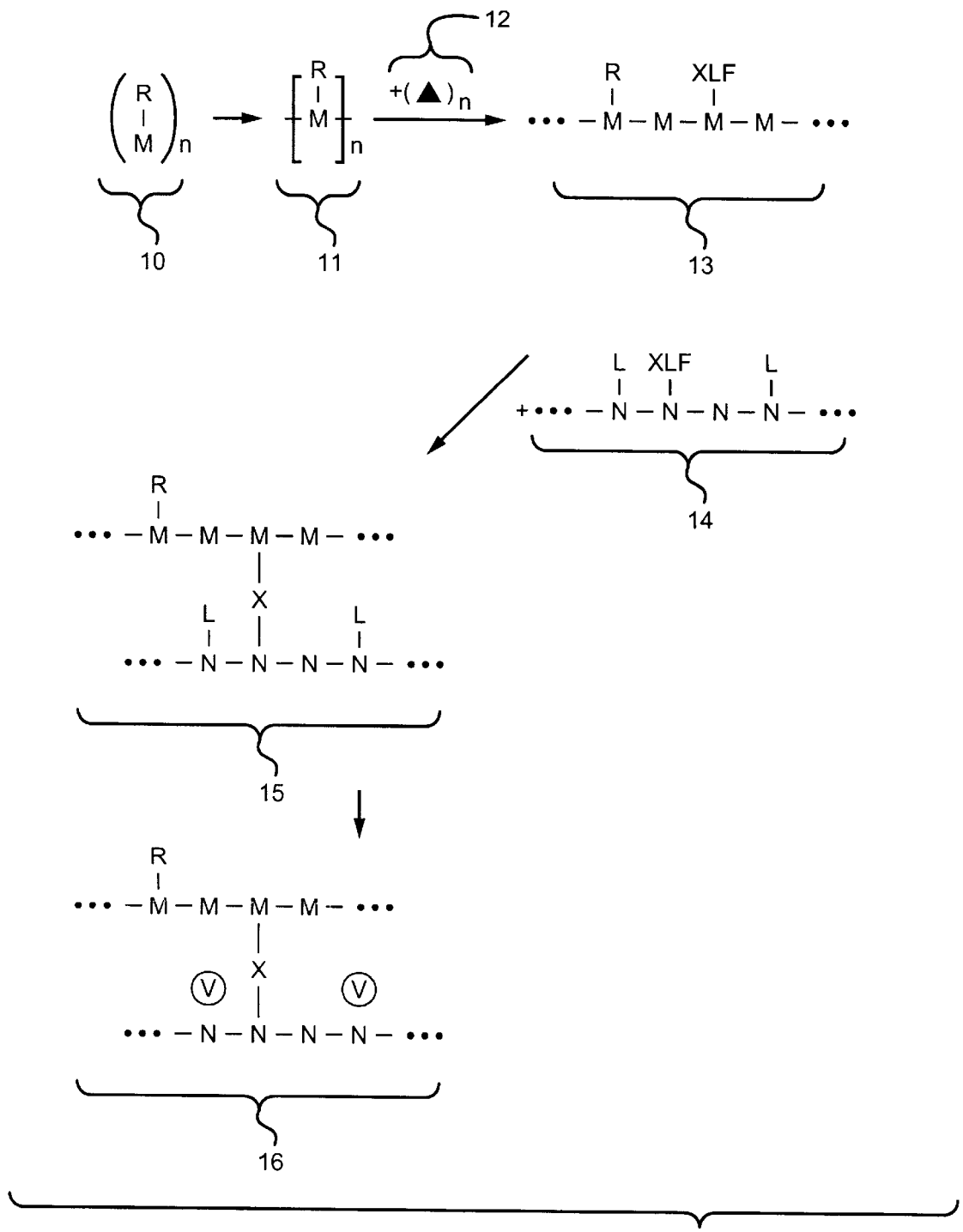
FIG. 3 is a schematic showing the fabrication of a nanoporous material from monomers according to one aspect of the inventive subject matter.

In FIG. 3, monomers M 10 are polymerized to form a polymeric template strand 11 having a plurality of reactive groups R. The number of repeating units, n, is preferably at least 5, more preferably at least 10, and still more preferably at least 100. Template strand 11 is subsequently used as a modifiable template for production of nanoporous materials. Here, some of the reactive groups R are reacted with a plurality of modifying molecules 12, thereby forming a crosslinking functionality XLF on the modified template strand 13. Another crosslinking functionality XLF, disposed on polymeric strand 14, which further has a plurality of thermolabile groups L, is reacted with the crosslinking functionality XLF of the modified template strand 13, such that the crosslinking functionalities crosslink both strands, thereby forming a crosslinked polymer 15 having a crosslink X. In another step, at least some of the thermolabile groups in the crosslinked polymer 15 are thermolyzed to produce a plurality of voids $\text{Ⓥ}$ thereby forming nanoporous polymer 16. The voids $\text{Ⓥ}$ are drawn in a circle to indicate that the voids $\text{Ⓥ}$ have no bond-like connection to the nanoporous polymer 16.

Figure 4:
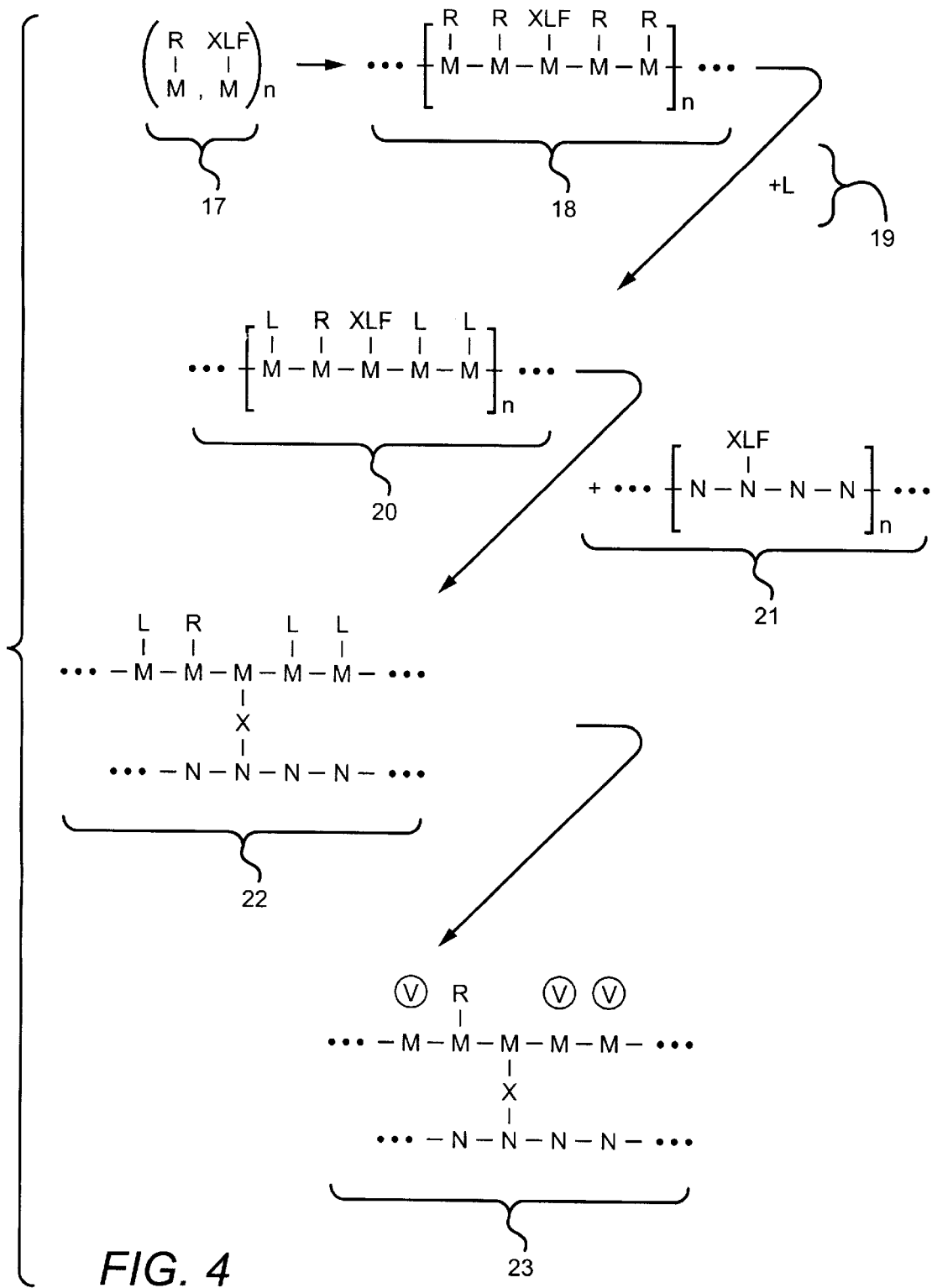
FIG. 4 is a schematic showing the fabrication of a nanoporous material from monomers according to another aspect of the inventive subject matter.

In FIG. 4, a plurality of monomers 17, some of which have a reactive group R and some of which have a crosslinking functionality XLF, are polymerized to form a template strand 18, having multiple reactive groups R and at least one crosslinking functionality XLF. As in the scheme of FIG. 3, the number of repeating units, n, is preferably at least 5, more preferably at least 10, and still more preferably at least 100. In another step, at least one of the reactive groups R is reacted with a thermolabile group L 19, thereby yielding a modified template strand 20. At least one of the crosslinking functionality XLF of the modified template strand 20 is reacted with another crosslinking functionality XLF on a polymeric strand 21 to crosslink the strands thereby forming a crosslinked polymer 22 having a crosslink X. In yet another step, at least some of the thermolabile groups in the crosslinked polymer 22 are thermolyzed to produce a plurality of voids $\text{Ⓥ}$ thereby forming nanoporous polymer 23.

The schemes set forth in FIGS. 3 and 4 are intended to be viewed in a generalized manner. As used herein, for example, the term "monomer" refers to any chemical compound that is capable of forming a covalent bond with itself or a chemically different compound in a repetitive manner. The repetitive bond formation between monomers may lead to a linear, branched, super-branched or three-dimensional products. Furthermore, monomers may themselves comprise repetitive building blocks, and when polymerized the polymers formed from such monomers are then termed "block copolymers", and a monomer that is repetitively incorporated into a compound (e.g. the template strand) is termed "repeating unit". Contemplated monomers may belong to various chemical classes of molecules including organic, organometallic or inorganic molecules. Examples of organic monomers are non-aromatic compounds such as acrylamide, vinylchloride, and aromatic compounds, such as a bisphenol and a difluoroaromatic compound. Particularly contemplated aromatic compounds include 4,4'-difluorobenzil, fluorene bisphenol, and 3,3'-dihydroxytolane. Examples of organometallic monomers are octamethylcyclotetrasiloxane, methylphenylcyclotetrasiloxane, etc., and examples of inorganic monomers include $SiO_2$ or $Al_2O_3$. The molecular weight of monomers may vary greatly between about 40 Dalton and 20000 Dalton. However, especially when monomers comprise repetitive building blocks, monomers may have even higher molecular weights. Monomers may also include thermolabile groups, crosslinking functionalities, and reactive groups. For example, monomers may comprise poly(propylene oxide), polycarbonates, poly (methylmethacrylate), various styrenic polymers, or ethynyl- or tetracyclone groups.

Under these definitions, template strands may thus be linear, branched, super-branched, or three-dimensional, and may include thermolabile portions, crosslinking functionalities and reactive groups. Template strands may belong to any chemical class, including organic, organometallic or inorganic compositions. Examples of organic template strands are polyimides, polyesters, or polybenzils. Examples of organometallic template strands are various substituted polysiloxanes. Examples of inorganic template strands include silica or alumina. Template strands may also comprise a wide range of functional or structural moieties, including aromatic systems, and halogenated groups. The molecular weight of contemplated template strands span a wide range, typically between 400 Dalton and 400000 Dalton or more.

Especially preferred template strands are polybenzils, and can be prepared from a difluoro. aromatic compound and an aromatic bisphenolic compound. In more preferred embodiments the aromatic bisphenolic compound comprises a fluorene bisphenol or a tolane, and the difluoroaromatic compound comprises a 4,4'-difluorobenzil. It is further contemplated that alternative polymeric strands may also include crosslinking functionalities in the backbone of the polymeric strand, and especially contemplated crosslinking functionalities comprise a diene and/or a dienophiles. A particularly preferred class of polymeric strands comprises template strands in which the crosslinking functionality comprises a tetracyclone and/or an ethynyl. Such strands can advantageously comprise The term "backbone" as used herein refers to a contiguous chain of atoms or moieties forming a polymeric strand, and covalently bound such that removal of any of the atoms or moiety would result in interruption of the chain.

Other preferred embodiments may be characterized by a modification of the aromatic portion of the aromatic bisphenolic compound, or modification of the aromatic portion of the difluoroaromatic compound. Such modifications may include isomeric variations, or addition or removal of aromatic groups. For example, a tetracyclone, halogens, amides, alcohols, aliphatic or aromatic substituents may be introduced into an aromatic portion of a 3,3'-dihydroxytolane. Analogous change, are also contemplated for the aromatic portion of a 4,4'-difluorobenzil. In yet another class of variations, an sp2-hybridized carbon atom may be replaced by any other appropriate atom, including sulfur, oxygen, nitrogen, etc.

The term "reactive group" as used herein refers to any elements or combinations of elements having sufficient reactivity to be used in covalent coupling with other elements or combinations of elements. Reactive groups are contemplated to be positioned in any part of the template strand or polymeric strand, and it is particularly contemplated that the reactive group or groups are located within the backbone of the template strand or polymeric strand. In preferred embodiments, the reactive group is a vicinal diketone group located within a difluoroaromatic compound of the template strand, and in a more preferred embodiment, the vicinal diketone group is part of a 4,4'-difluorobenzil.

Although a vicinal diketone group is generally preferred, various alternative reactive groups are also contemplated, including nucleophilic and electrophilic groups, radical groups, polar and apolar groups, and so forth, so long as appropriate groups have sufficient reactivity to be used in covalent coupling with other elements or combinations of elements. For example, alternative groups are acid chloride groups, anhydride groups, a diene or dienophile, ring systems with 4 or less atoms, etc. It is further contemplated that the number of reactive groups in a template or polymeric strand may vary widely. For example, where the reactive group is employed to form a crosslinking functionality, the number of reactive groups would typically depend on the strength of coupling required, as well the strength of the individual crosslinking links. It is further contemplated that the number of reactive groups participating in formation of a crosslinking functionality may vary within a wide range. For example, the formation of crosslinking functionalities may involve as little as 5%, of reactive groups or less, but may also involve more than 90% of all available reactive groups in the template strand. Similarly, where the reactive group is employed to react with (i.e., to introduce) a thermolabile group, the number may vary considerably, and will predominantly depend on the desired molar fraction of thermolabile groups in the crosslinked polymer.

With respect to the modifying molecule it is generally contemplated that modifying molecules form a crosslinking functionality upon chemical reaction with a reactive group. The term "forming a crosslinking functionality" as used herein refers to a de novo generation of a crosslinking functionality that has not been present in either the reactive group or the modifying molecule, and expressly excludes an introduction of a crosslinking functionality already present in a modifying molecule. Especially preferred modifying molecules form a crosslinking functionality within the backbone of a template strand, and form a diene as a crosslinking functionality. In a generally preferred aspect of the inventive subject matter, the modifying molecule comprises an aromatic portion, and in one particularly preferred aspect, the modifying molecule comprises a 1,3-diarylpropane-2-one or a 1,2-diaminoaryl. For example, contemplated modifying molecules are substituted and unsubstituted 1,3-diphenylpropane-2-one and 1,2-diaminobenzene. It should also be appreciated that the modifying molecule may further comprise additional crosslinking functionalities, thermolabile groups, reactive groups, etc.

Consequently, depending on the chemical nature of the modifying molecule, the de novo formed crosslinking functionality may vary considerably. The term "crosslinking functionality" as used herein refers to a chemical group that reacts with another chemical group to join together at least two molecules, or two portions of a long molecule, by a chemical interaction. Such interactions may occur in many different ways including formation of a covalent bond, formation of hydrogen bonds, hydrophobic, hydrophilic, ionic or electrostatic interaction. Furthermore, chemical interaction may also be characterized by an at least temporary physical connection between at least one molecule with itself or between two or more molecules. Generally contemplated crosslinking functionalities comprise a nucleophilic group, an electrophilic group, a diene, a dienophile, and particularly contemplated crosslinking functionalities comprise a tetracyclone and an ethynyl. Other contemplated crosslinking functionalities include functionalities having thermodynamically or kinetically favored leaving groups, activated nucleophilic or electrophilic centers. It should further be appreciated that the crosslinking functionality on the polymeric strand need not be identical with the crosslinking functionality on the template strand. For example, the crosslinking functionality of the template strand may comprise a tetracyclone, while the crosslinking functionality on the polymeric strand may comprise an ethynyl.

With respect to reacting the crosslinking functionality it is contemplated that the reaction leading to crosslinking may occur by numerous mechanisms. If a covalent bond is formed between two crosslinking functionalities, it may be formed by a variety of chemical reaction mechanisms, including additions, eliminations or substitutions. Examples are a Diels-Alder reaction, nucleophilic or electrophilic addition, E1- or E2-type eliminations, nucleophilic and aromatic substitutions. It is further contemplated that crosslinking may be a spontaneous process or may require energy or a catalyst. Examples of such energy are thermal energy, radiation, and mechanic, electric or electromagnetic energy, and examples of catalysts are acids, bases, and palladium-coated activated charcoal. In yet further alternative embodiments, crosslinking may or may not involve additional extrinsic crosslinkers, and any extrinsic crosslinker may comprise single molecules, oligomeric or even polymeric molecules.

Although the polymeric strand is preferably a poly (arylene ether), in other aspects of the inventive subject matter the polymeric strand may be completely different from a poly(arylene ether). Alternative template strands are contemplated to include organic, organometallic or inorganic portions. Examples of contemplated organic template strands are polyimides, polyesters and polycyanurates. Examples of contemplated organometallic template strands are poly(dimethylsiloxane) and poly(vinylsiloxane). Examples of contemplated inorganic template strands are silica and alumina. Indeed, contemplated template strands need not comprise a single type of monomer, but may comprise a mixture of various non-identical monomers. It should further be appreciated that contemplated polymeric strands may also comprise a reactive group such as a vicinal diketone, a thermolabile group such as a polypropylene oxide, and a crosslinking functionality such as an ethynyl. In a particularly contemplated aspect of the inventive subject matter, the polymeric strand comprises a template strand. Thus, crosslinking may not only occur between a polymeric strand and a modified template strand, but also between two modified template strands.

The term "thermolabile" as used herein refers to the property of a material to degrade above an elevated temperature, typically in the range of 250° C. to 450° C. It should be understood that the thermolabile groups of FIGS. 3 and 4 may be positioned in any part of the template strand, polymeric strand (including backbones and termini), and modifying molecule. Preferred thermolabile groups include aliphatic portions, and especially preferred thermolabile groups are polypropylene-oxide, polylactides, polycarbonates or polymethylmethacrylate. In a preferred embodiment, the thermolabile portion comprises an ethylene glycol-poly (caprolactone), and in more preferred embodiments, about 2–25% of the difluoroaromatic portion of a poly(arylene ether) carries an ethylene glycol-poly(caprolactone) with an average molecular weight of approximately 3000 Dalton.

Thermolabile groups L may advantageously include a connector moiety. The term "connector moiety" should be interpreted broadly herein to mean any kind of chemical moiety that is (a) capable of reacting with a reactive group in a template strand or polymeric strand, and (b) is covalently coupled to a thermolabile group. Many types of reactions, including substitutions, eliminations and additions, may be involved to form a covalent bond between a connector moiety and a reactive group. Examples are esterification, amidation, epoxidation, etc. The size of the connector moiety may vary considerably from molecular weights of about 20 Dalton to about and above 500 Dalton. Examples of relatively small connector moieties are acidic groups, basic groups, nucleophilic groups and electrophilic groups. Alternative small connector moieties are, for example, R—$CO_2$H, R—CO—R', R—$NH_2$, R—SH, R-Halogen and so on. Examples of larger connector moieties are substituted aromatic groups, including especially substituted 1,2-diaminobenzenes or substituted 1,3-diphenylpropan-2-ones. It is still further contemplated that alternative connector moieties need not have a single type of functional group or single type of substituent, but alternative connector moieties may also be a mixture of various non-identical connector moieties.

The term "degrade" as used herein refers to the breaking of covalent bonds. Such breaking of bonds may occur in many ways, including heterolytic, radical, and homolytic breakage. The breaking of bonds need not be complete, i.e. not all breakable bonds must be cleaved. Furthermore, the breaking of bonds may occur in some bonds faster than in others. Ester bonds, for example, are generally less stable than amid bonds, and may therefore be cleaved at a faster rate. Breakage of bonds may also result in the release of fragments differing from one another, depending on the chemical composition of the degraded portion. The energy involved in thermolysis may comprise thermal, electromagnetic, mechanical energy, particulate or non-particulate radiation. For example, an appropriate energy could be alpha-radiation, sonication, microwaves or heating.

It should be appreciated that a considerable variety of nanoporous materials can be fabricated using a single type of template strand, such as that shown as strands 11 and 18, and a general process to produce nanoporous materials could be described as including the steps of: providing a template strand having a plurality of repeating units and a plurality of reactive groups; reacting at least one of the reactive groups with a modifying molecule, thereby forming at least one crosslinking functionality; reacting the at least one crosslinking functionality to another crosslinking functionality situated on a polymeric strand to crosslink the template strand with the polymeric strand, thereby forming a crosslinked polymer, wherein at least one of the modifying molecule and the polymeric strand has a thermolabile group; and providing sufficient energy to the crosslinked polymer to degrade at least part of the thermolabile group, and thereby produce a void.

Figure 5:
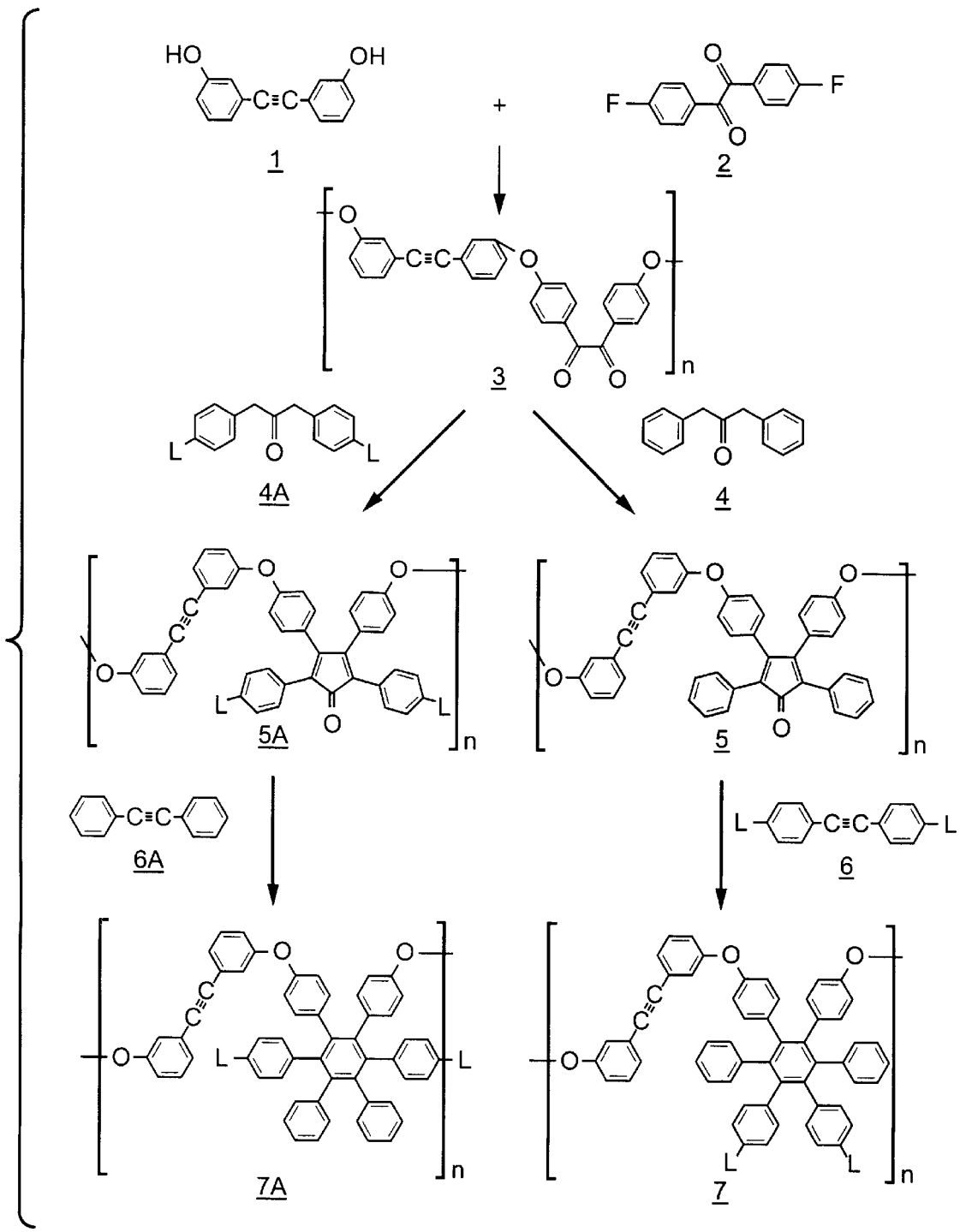
FIG. 5 is a synthetic scheme showing the fabrication of a modified template strand via a polybenzil according to one aspect of the inventive subject matter.

FIG. 5 shows an exemplary synthesis of a modified template strand according to the inventive subject matter, in which a template strand is produced from aromatic bisphenolic and difluoroaromatic monomers that are polymerized via a nucleophilic aromatic substitution. 3,3'-dihydroxytolane (1) and 4,4'-difluorobenzil (2) are polymerized in NMP/$K_2CO_3$ at about 140 C for a period of 2–24 hrs to yield polybenzil (3). At least some of the vicinal carbonyl groups in the polybenzil (3) are then reacted with the modifying molecule 1,3-diphenylpropane-2-one (4) under conditions previously described (e.g., L. F. Fieser and M.

Fieser, Reagents for Organic Synthesis, Volume 1, John Wiley & Sons, Inc., publishers, 1967, pp1149). The resulting modified template strand (5) comprises tetracyclone moieties, which can further be reacted in a Diels-Alder reaction with a tolane carrying thermolabile groups (6) to yield a modified polybenzil harboring thermolabile groups (7). Alternatively, the polybenzil (4) can be reacted with a substituted 1,3-diphenylpropane-2-one (4A) carrying thermolabile groups under the same conditions as described above to yield a modified polybenzil harboring thermolabile groups (5A).

In preferred embodiments, the monomers are fluorene bisphenol and 4,4'-difluorobenzil, and in still more preferred embodiments, the monomers are 3,3'-dihydroxytolane and 4,4'-difluorobenzil, which are polymerized to form a thermostable polybenzil. The term "thermostable" as used herein refers to the tendency of a material to resist elevated temperatures, typically in the range of 250° C. to 450° C. Exemplary reaction conditions for production of a polybenzil are outlined in FIG. 5. It should be appreciated that depending on the chemistry of alternative monomers, various mechanism other than nucleophilic aromatic substitutions are also appropriate, including addition and substitution reactions. The repeating units in this embodiment are represented by alternating difluoroaromatic portions and aromatic bisphenols, while the reactive groups are vicinal diketone groups. It should be appreciated that the step of providing a template strand need not be limited to polymerization of monomers. In alternative aspects of the inventive subject matter, the use of a preformed template strand having a plurality of reactive groups and a plurality of repeating units is also contemplated.

With respect to the step of reacting at least one of the reactive groups with a modifying molecule, FIG. 5 shows a reaction of a vicinal diketone group in the template strand with a substituted 1,3-diphenylpropane-2-one as a modifying molecule. In preferred embodiments, the substituents of the modifying molecule comprise thermolabile groups, and most preferred thermolabile groups comprise an aliphatic portion such as poly(propylene oxide), poly(methylmethacrylate), polylactone, polycarbonate, and ethylene glycol poly(caprolactone). The crosslinking functionality formed by the reaction between the modifying molecule and the reactive group is a tetracyclone, and general reaction conditions for the formation of a tetracyclone from a substituted 1,3-diphenylpropane-2-one with a vicinal diketone group is described e.g., in L. F. Fieser and M. Fieser, Reagents for Organic Synthesis, Volume 1, John Wiley & Sons, Inc., publishers, 1967, ppl 149. Thus, the template strand is converted to a modified template strand comprising a tetracyclone as a crosslinking functionality. It should especially be appreciated that not all of the reactive groups need to react with a modifying molecule to yield a crosslinking functionality. Thus, by controlling the reaction and amount of the modifying group, the amount of crosslinking functionalities in a modified template strand can simply and effectively be controlled.

In a further step, the tetracyclone in the modified template strand is reacted with another crosslinking functionality, which is situated on a polymeric strand. In a preferred aspect of the inventive subject matter, the polymeric strand is a polybenzil, prepared from an equimolar mixture of 3,3'-dihydroxytolane and 4,4'-difluorobenzil according to a procedure as outlined in FIG. 5 for the template strand. The ethynyl group in the polymeric strand reacts in a Diels-Alder reaction without addition of an exogenous crosslinker to a cycloaddition product, thereby crosslinking the template strand and the polymeric strand, and forming a crosslinked polymer. A typical reaction condition for a cycloaddition between an ethynyl and a tetracyclone is heating the modified template strand and polymeric strand to about 280°–300° C. for approximately 120 min. In a typical crosslinking procedure, both the template strand and the polymeric strand are blended, dissolved in a solvent and spin-coated on a substrate that is subsequently heated to crosslink the strands.

It should be especially appreciated that the polymeric strand may advantageously be another or the same template strand. In cases where the polymeric strand is a template strand, self-crosslinking within a single template strand or among two or more template strands may occur. For example, where the template strand is a polybenzil that comprises an ethynyl group, and where the modifying molecule reacts with a reactive group to form a tetracyclone, two crosslinking groups are disposed within a template strand that are capable of reacting with each other.

With respect to the step of providing sufficient energy, the energy employed is preferably thermal energy. In particular embodiments, for example, the crosslinked polymer is heated to about 350° C. for approximately 20 min. In alternative embodiments the temperature may vary considerably, depending on the nature of the thermolabile and thermostable portion of the crosslinked polymeric chains. Contemplated temperatures may thereby range from 200° C. or less, to about 350° C., 450° C., or even more. In further alternative embodiments, the time required to degrade at least part of the thermolabile group may also vary greatly between a few seconds or less to several hours or more. Alternatively, the energy may be a different form of energy than thermal energy. Such alternative energies include various electromagnetic radiations (e.g., are UV-, laser-, X-rays or infrared irradiation), mechanical energy (e.g. sonication or physical pressure), and particle radiation (e.g., alpha- or beta-radiation).

Figure 6:
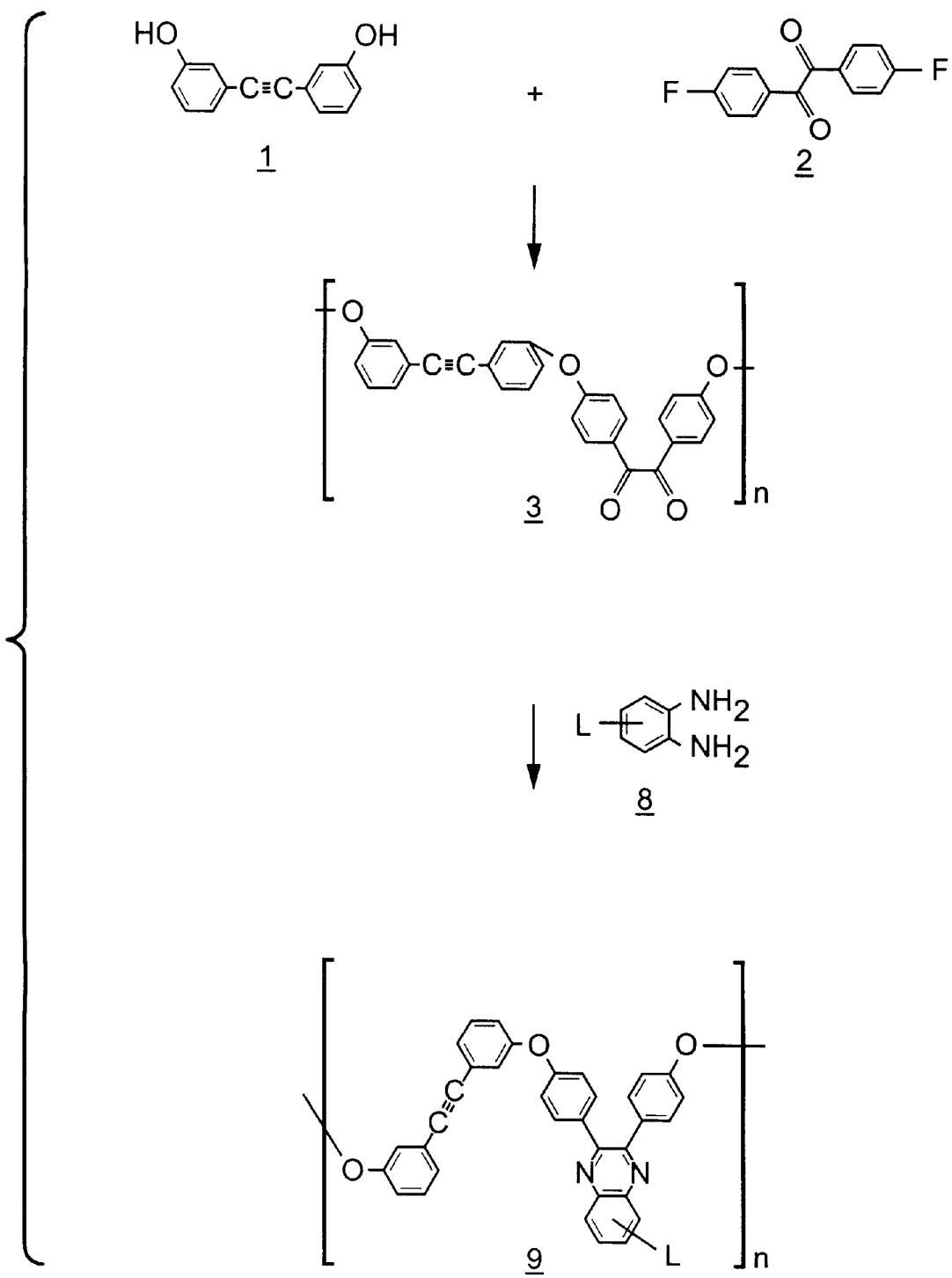
FIG. 6 is a synthetic scheme showing the fabrication of another modified template strand via a polybenzil according to another aspect of the inventive subject matter.

In yet further alternative aspects of the inventive subject matter, another method of producing a nanoporous composition as generally outlined in FIG. 6 could be described as including the steps of: providing a template strand having a plurality of repeating units, a plurality of reactive groups, and at least one crosslinking functionality; reacting at least one of the reactive groups with a thermolabile group; reacting the at least one crosslinking functionality to another crosslinking functionality on a polymeric strand to crosslink the template strand with the polymeric strand, thereby forming a crosslinked polymer; and providing sufficient energy to the crosslinked polymer to degrade at least part of the thermolabile group, and thereby produce a void.

In FIG. 6, 3,3'-dihydroxytolane (1) and 4,4'-difluorobenzil (2) are reacted under conditions as described above to yield polybenzil (3). The polybenzil is then reacted with a 1,2-diaminobenzene carrying a thermolabile group (8) to yield a polyquinoxaline strand (9) having thermolabile groups.

With respect to the step of providing a template strand, the same considerations as described above apply (vide supra), however, contemplated template strands further include at least one crosslinking functionality. Preferred crosslinking functionalities include a diene and a dienophile, a nucleophile and an electrophile, and especially preferred crosslinking functionalities are a tetra-cyclone and an ethynyl. It should further be appreciated that contemplated crosslinking functionalities may be situated in various portions of the template strand, including the backbone, the termini, and in pendent groups. With respect to the number of crosslinking functionalities it should be appreciated that the number may vary considerably, and predominantly depends on the desired degree of crosslinking and general reactivity of the crosslinking functionalities. For example, where high degree of crosslinking is desired, 30%–50% of all repeating units and more may carry a crosslinking functionality. On the other hand, in cases where only a minor degree of crosslinking is wanted, 0.01% to 10% of all repeating units and more may carry a crosslinking functionality.

With respect to the step of reacting at least one of the reactive groups to a thermolabile group, it is contemplated that the thermolabile groups preferably comprise a poly (propylene oxide), poly(methylmethacrylate), polylactone, polylactide, or polycarbonate. In alternative embodiments, the thermolabile group may comprise a variety of aliphatic compounds including esters, ethers, cabonates or substituted aliphatic chains, and an example herefor are polylactides, polycarbonates, styrenics and lactones. It is further contemplated that independent of the chemical nature of the thermolabile groups, appropriate thermolabile groups need not be of a single type, but may also be a mixture of various non-identical thermolabile groups.

The thermolabile group is preferably coupled to the reactive groups via a connector moiety. In one class of preferred embodiments the connector moiety may advantageously comprise 1,3-diphenylpropane-2-one, which reacts with reactive groups of the template strand in a condensation reaction to form a poly(arylene tetracyclone). Thus, the introduction of a thermolabile group into the template strand concurrently forms a crosslinking functionality. In other preferred embodiments, the connector moiety comprises a 1,2-diaminobenzene, which reacts with the reactive group of the template strand in an imidation reaction to form a poly(quinoxaline). Alternative types of reaction mechanisms include nucleophilic-, electrophilic- or aromatic substitution, or addition-type reactions, including esterification, epoxidation, amidation, and Michael-addition.

There is no absolute requirement that all of the thermolabile groups are reacted prior to crosslinking. For example, a small portion of reactive groups may be employed in crosslinking, followed by a second, larger portion of reactive groups employed in adding thermolabile groups. Subsequently, a third, even larger portion of reactive groups may be employed in second round of crosslinking. Those skilled in the art will recognize that many other permutations are available as well.

With respect to the step of reacting the at least one crosslinking functionality, the same considerations apply as discussed above, however, with the exception that the limitation of "at least one of the modifying molecule and the polymeric strand has a thermolabile group" need not apply. With further respect to the step of providing sufficient energy, the same considerations apply as discussed above.

Thus, a great variety of nanoporous materials can be fabricated according to the inventive subject matter presented herein, and as used herein, the term "nanoporous material" and "nanoporous composition" refers to any material that includes a significant number of voids with diameters in a range of about 1 nm to about 1000 nm. Furthermore, the dielectric constants of nanoporous materials thus prepared tend to have values in the range of 2.0 to 2.5. They have TG values generally above 400° C., are thermally stable and easily processable by standard spin-bake-cure processing techniques. They also tend to have very low moisture absorption and yield no significant outgassable materials below 400° C.

Nanoporous materials may be characterized by the extent to which mass is replaced with a gas. The composition of the gas is generally not critical, and appropriate gases include relatively pure gases and mixtures thereof. Air (which is predominantly a mixture of $N_2$ and $O_2$) is commonly disposed in the "voids" of nanoporous materials, but pure gases such as nitrogen, helium, argon, $CO_2$ or CO are also contemplated. Nanoporous materials may also be characterized by the structure of the voids. Nanoporous materials typically include spherical voids, but may alternatively or additionally include tubular, lamellar, discoidal, and voids having other shapes. Moreover, some of the voids in nanoporous material may be substantially larger or smaller than about 1 nm to 1 $\mu$m. Nanoporous materials may have many different forms, including but not limited to thin films, plates, spheres, blocks or cylinders. Nanoporous materials may also comprise additional materials, includeing fillers, surfactants and plasticizers.

The nanoporous polymers described herein are similar in some respects to those described in U.S. Pat. No. 5,874,516 to Burgoyne et al. (February 1999), incorporated herein by reference, and may be used in substantially the same manner as set forth in that patent. For example, it is contemplated that nanoporous polymers described herein may be employed in fabricating multichip modules, interlayer dielectrics, protective coatings, and as a substrate in circuit boards or printed wiring boards. Moreover, films or coatings of the nanoporous polymers described herein can be formed by solution techniques such as spraying, spin coating or casting, with spin coating being preferred. Preferred solvents are 2-ethoxyethyl ether, cyclohexanone, cyclopentanone, toluene, xylene, chlorobenzene, N-methyl pyrrolidinone, N,N-dimethylformamide, N,N-dimethylacetamide, methyl isobutyl ketone, 2-methoxyethyl ether, 5-methyl-2-hexanone, y -butyrolactone, and mixtures thereof. Typically, the coating thickness is between about 0.1 to about 15 microns. As a dielectric interlayer, the film thickness is less than 2 microns. Additives can also be used to enhance or impart particular target properties, as is conventionally known in the polymer art, including stabilizers, flame retardants, pigments, plasticizers, surfactants, and the like. Compatible or non-compatible polymers can be blended in to give a desired property. Adhesion promoters can also be used. Such promoters are typified by hexamethyidisilazane, which can be used to interact with available hydroxyl functionality that may be present on a surface, such as silicon dioxide, that was exposed to moisture or humidity. Polymers for microelectronic applications desirably contain low levels (generally less than 1 ppm, preferably less than 10 ppb) of ionic impurities, particularly for dielectric interlayers.

EXAMPLES

Examples 1–8 describe the production of nanoporous materials using template strands from FIG. 5 (poly(arylene tetracyclone)) and FIG. 6 (poly(arylene quinoxaline)), in both of which L depicts a thermolabile group. In examples 1–6, precursors prepared substantially as set forth above with respect to FIG. 5 are modified and then blended prior to thin film spin-coating (preferably under argon ambient). In examples 7–8, single-component polymers are used for thin film spin-coating, again using precursors prepared substantially as set forth above with respect to FIG. 5. Crosslinking in all of these examples is preferably accomplished using a heating step at about 250° C.–350° C. Those skilled in the art will appreciate that other polymers could be substituted for the polybenzils in conjunction with the teachings herein to expand these examples into general classes of procedures.

Example 1

From the polybenzil precursor prepared from fluorene bisphenol and 4,4'difluorobenzil, a poly(arylene tetracyclone) is formed with a 1,3-diarylpropan-2-one, which has thermally labile appendages on the aryl groups. After blending of this poly(arylene tetracyclone) with an ethynylcontaining polymer, thin film formation, and in situ crosslinking, the thermally labile group is thermolyzed, resulting in porosity.

Example 2

From the polybenzil precursor prepared from fluorene bisphenol and 4,4'difluorobenzil, a poly(arylene tetracyclone) is formed with a 1,3-diphenylpropan-2-one. This polymer can be blended with an ethynyl-containing polymer having a built-in thermolyzable component prior to thin film formation. The blend is crosslinked in situ, and the thermally labile group is thermolyzed, resulting, in porosity.

Example 3

From the polybenzil precursor prepared from 3,3'-dihyroxytolane and 4,4'difluorobenzil, a poly(arylene tetracyclone) is formed with a 1,3-diarylpropan-2-one, which has thermally labile appendages on the aryl groups. After blending of this poly(arylene tetracyclone) with an ethynyl-containing polymer, thin film formation, and in-situ crosslinking, the thermally labile group is thermolyzed, resulting in porosity. Alternatively, this polymer can be used as a single-component self-crosslinkable system due to the presence of tetracyclone, ethynyl, and the thermolyzable units in the polymer structure.

Example 4

From the polybenzil precursor prepared from 3,3'-dihyroxytolane and 4,4'difluorobenzil, an ethynyl-containing poly(arylene tetracyclone) can be obtained from further reaction of the template with 1,3-diphenylpropan-2-one. This polymer can be blended with an ethynyl-containing poly(arylene) ether) or polymer, containing a grafted thermally labile component, and cured to a crosslinked network before the labile group is thermolyzed, resulting in porosity.

Example 5

From the polybenzil precursor prepared from 3,3'-dihyroxytolane and 4,4'difluorobenzil, an ethynyl-containing poly(arylene quinoxaline) can be obtained from further reaction of the template strand with a substituted 1,2-diaminobenzene containing an appendage which includes a thermally labile aliphatic polymer, such as polycaprolactone or polynorbonylene. After blending of this poly(arylene quinoxaline) with a tetracyclone-containing polymer such as the poly(arylene tetracyclone) in example 2 above, thin film formation, and in situ crosslinking, the thermally labile group is thermolyzed, resulting in porosity.

Example 6

From the polybenzil precursor prepared from 3,3'-dihyroxytolane and 4,4'difluorobenzil, an ethynyl-containing poly(arylene quinoxaline) can be obtained from further reaction of the template strand with a substituted 1,2-diaminobenzene containing an appendage which includes a thermally labile aliphatic polymer, such as polycaprolactone or polynorbonylene. After blending of this poly(arylene quinoxaline) with a tetracyclone-containing material that also has thermolyzable groups, thin film formation, and in situ crosslinking, the thermally labile group are thermolyzed, resulting in porosity.

Example 7

From the polybenzil precursor prepared from fluorene bisphenol and 4,4'difluorobenzil, and grafted with blocks of thermally labile units, a poly(arylene tetracyclone) is formed by reacting this, product with a 1,3-diarylpropan-2-one with phenylethynyl appendages.

Example 8

From the polybenzil precursor prepared from 3,3'-dihyroxytolane and 4,4'difluorobenzil, and grafted with blocks of thermally labile units, an ethynyl-containing poly(arylene tetracyclone) is obtained from further reaction of the product with 1,3-diphenylpropan-2-one.

Thus, specific embodiments and applications of nanoporous material fabricated using polymeric template strands have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of producing a nanoporous composition comprising:

providing a template strand having a plurality of repeating units and a plurality of reactive groups;

reacting at least one of the reactive groups with a modifying molecule, thereby forming at least one crosslinking functionality;

reacting the at least one crosslinking functionality to another crosslinking functionality on a polymeric strand to crosslink the template strand with the polymeric strand, thereby forming a crosslinked polymer, wherein at least one of the modifying molecule and the polymeric strand has a thermolabile group; and providing sufficient energy to the crosslinked polymer to degrade at least part of the thermolabile group, and thereby producing a void.

2. The method of claim 1, wherein the step of providing a template strand comprises polymerizing a plurality of monomers by a reaction mechanism selected from the group consisting of addition and substitution reactions.

3. The method of claim 2, wherein the substitution reaction comprises a nucleophilic aromatic substitution.

4. The method of claim 2, wherein at least one of the monomers comprises an aromatic compound.

5. The method of claim 4, wherein the aromatic compound is selected from the group consisting of a bisphenol and a difluoroaromatic compound.

6. The method of claim 5, wherein the aromatic compound is selected from the group consisting of a 4,4'-difluorobenzil, a fluorene bisphenol and a 3,3'-dihydroxytolane.

7. The method of claim 1, wherein the thermolabile group comprises an aliphatic portion.

8. The method of claim 1, wherein the aliphatic portion is selected from the group consisting of a poly(propylene oxide), a poly(methylmethacrylate), a polylactone, a polylactide, a polycarbonate, and an ethylene glycol-poly(caprolactone).

9. The method of claim 1 wherein the modifying molecule comprises an aromatic portion.

10. The method of claim 9 wherein the modifying molecule is selected from the group consisting of a 1,3-diarylpropane-2-one and a 1,2-diaminoaryl.

11. The method of claim 9 wherein the modifying molecule is selected from the group consisting of a 1,3-diphenylpropane-2-one and a 1,2-diaminobenzene.

12. The method of claim 1 wherein the modifying molecule further comprises a thermolabile portion.

13. The method of claim 1 wherein the crosslinking functionality comprises a chemical group selected from the group consisting of a diene, a dienophile, a nucleophile, and an electrophile.

14. The method of claim 13 wherein the crosslinking functionality comprises a chemical group selected from the group consisting of a tetracyclone and an ethynyl.

15. The method of claim 1, wherein the step of reacting the at least one crosslinking functionality involves a Diels-Alder reaction.

16. The method of claim 1, wherein the polymeric strand comprises an ethynyl.

17. The method of claim 1, wherein the polymeric strand comprises the template strand.

18. A method of producing a nanoporous composition comprising:

providing a template strand having a plurality of repeating units, a plurality of reactive groups, and at least one crosslinking functionality;

reacting at least one of the reactive groups with a thermolabile group;

reacting the at least one crosslinking functionality to another crosslinking functionality on a polymeric strand to crosslink the template strand with the polymeric strand, thereby forming a crosslinked polymer; and providing sufficient energy to the crosslinked polymer to degrade at least part of the thermolabile group, and thereby producing a void.

19. The method of claim 18, wherein the step of providing a template strand comprises polymerizing a plurality of monomers by a reaction mechanism selected from the group consisting of addition and substitution reactions.

20. The method of claim 18, wherein the template strand comprises a polybenzil.

21. The method of claim 18, wherein the at least one crosslinking functionality comprises an ethynyl.

22. The method of claim 18 wherein the thermolabile group comprises an aromatic portion.

23. The method of claim 22 wherein the thermolabile group comprises a 1,2-diaminoaryl.

24. The method of claim 18 wherein the step of reacting the at least one of the first reactive groups with a thermolabile group produces a poly(arylene quinoxaline).

25. The method of claim 18 wherein the step of reacting the at least one crosslinking functionality to another crosslinking functionality involves a Diels-Alder reaction.

* * * * *